H. TILDEN.
Churn-Dashers.
No. 223,413.    Patented Jan. 6, 1880.
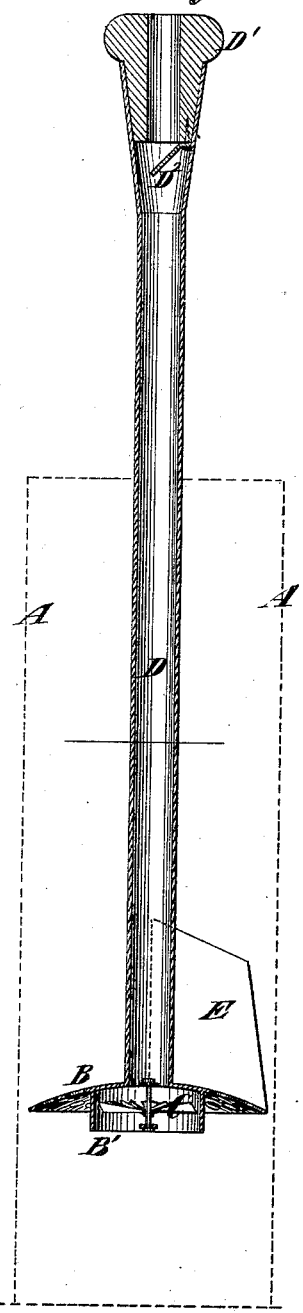
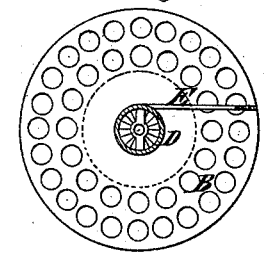
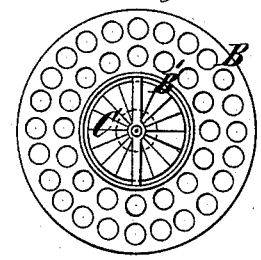
Witnesses
John Becker
Thomas E. Birch
Inventor
Howard Tilden
by his Attorneys
Brown & Brown

UNITED STATES PATENT OFFICE.

HOWARD TILDEN, OF PHILADELPHIA, PA., ASSIGNOR OF ONE-HALF OF HIS RIGHT TO CALVIN D. HAYWARD, OF NEW YORK, N. Y.

CHURN-DASHER.

SPECIFICATION forming part of Letters Patent No. 223,413, dated January 6, 1880.

Application filed November 10, 1879.

*To all whom it may concern:*

Be it known that I, HOWARD TILDEN, of Philadelphia, in the county of Philadelphia and State of Pennsylvania, have invented certain new and useful Improvements in Churn-Dashers, of which the following is a specification.

My invention consists in the combination, with a churn-dasher, of a propeller-wheel arranged horizontally upon or within the same, and adapted to be rotated by the cream as the dasher is moved upward and downward. The dasher is also provided with a hollow tubular handle or rod arranged concentrically with said propeller-wheel, which is provided at the top with an inwardly-opening valve, through which air is drawn in as the dasher is raised. The air drawn into the handle is compressed by the downward motion of the dasher, and serves to accelerate the movement of the propeller.

In the accompanying drawings, Figure 1 represents a vertical section of a churn-dasher embodying my improvements. Fig. 2 represents a plan of the dasher, and Fig. 3 represents an inverted plan thereof.

Similar letters of reference designate corresponding parts in all the figures.

A designates the churn proper, (shown in dotted outline,) and B the dasher thereof. The dasher is here represented as made of sheet metal and provided with perforations, through which the milk is forced as the dasher is moved.

Below the dasher is a downwardly-extending cylindrical portion, B', similar to that described and illustrated in Letters Patent No. 45,194, granted me November 22, 1864.

Within the cylindrical portion B' is a horizontally-arranged propeller-wheel, C, adapted to be rotated rapidly by the action of the cream in moving the dasher.

It is supposed that the particles of butter are contained in minute sacs, and the action of the propeller-wheels serves to break these sacs and release the particles of butter contained therein.

The rod D of the dasher, which is arranged concentrically with the wheel, is made in the form of a hollow tube, and is closed at the top by a plug, D', through which is an opening; and $D^2$ designates an inwardly-opening valve attached to the plug.

As the dasher is moved upward the air is drawn in through the valve; but as the dasher is moved downward the valve closes and the air contained in the tube is compressed, and serves to drive out all the cream contained in the lower part of the rod.

By the air-pressure the cream is forcibly ejected from the tube, and the action of the propeller-wheel rendered more effective.

E designates a wing extending from the rod D above the dasher, and serving as a scraper to collect the butter after the churning. As here represented, the wing or scraper E does not extend radially from the center of the rod, but tangentially from one side of the rod, as clearly shown in Fig. 2, and when turned in one direction the wing serves not only to scrape the butter from the side of the churn, but also serves to move the butter inward, so that it collects at the center near the rod.

What I claim as my invention, and desire to secure by Letters Patent, is—

The combination, in a churn-dasher, of a tubular rod or handle provided with an inwardly-opening valve, and a propeller-wheel arranged horizontally upon or within the dasher concentrically with and below said rod or handle, and adapted to be rotated by the cream as the dasher is moved upward and downward, substantially as and for the purpose specified.

HOWARD TILDEN.

Witnesses:
HENRY T. BROWN,
FREDK. HAYNES.